United States Patent
Li et al.

(10) Patent No.: US 8,305,711 B2
(45) Date of Patent: Nov. 6, 2012

(54) PROCESS OF OCTAGONAL POLE FOR MICROWAVE ASSISTED MAGNETIC RECORDING (MAMR) WRITER

(75) Inventors: Min Li, Dublin, CA (US); Cherng-Chyi Han, San Jose, CA (US); Kenichi Takano, Santa Clara, CA (US); Joe Smyth, Aptos, CA (US)

(73) Assignee: Headway Technologies, Inc., Milpitas, CA (US)

( * ) Notice: Subject to any disclaimer, the term of this patent is extended or adjusted under 35 U.S.C. 154(b) by 314 days.

(21) Appl. No.: 12/660,819

(22) Filed: Mar. 3, 2010

(65) Prior Publication Data
US 2011/0216447 A1    Sep. 8, 2011

(51) Int. Cl.
*G11B 5/187* (2006.01)
*G11B 5/127* (2006.01)
*G11B 5/02* (2006.01)

(52) U.S. Cl. ............... 360/125.31; 360/125.09; 360/59

(58) Field of Classification Search .................. 360/122, 360/125.09, 125.31, 59
See application file for complete search history.

(56) References Cited

U.S. PATENT DOCUMENTS

| 7,333,296 | B2 | 2/2008 | Sasaki et al. | |
|---|---|---|---|---|
| 7,616,412 | B2 | 11/2009 | Zhu et al. | |
| 8,164,986 | B2 * | 4/2012 | Aoki et al. | 369/13.01 |
| 2006/0002017 | A1 | 1/2006 | Taguchi et al. | |
| 2006/0250712 | A1 | 11/2006 | Matono et al. | |
| 2007/0283557 | A1 | 12/2007 | Chen et al. | |
| 2009/0034130 | A1 | 2/2009 | Garfunkel et al. | |
| 2009/0059426 | A1 | 3/2009 | Sasaki et al. | |
| 2009/0257151 | A1 | 10/2009 | Zhang et al. | |
| 2009/0279213 | A1 | 11/2009 | Wu et al. | |

OTHER PUBLICATIONS

Co-Pending US Patent HT09-037, U.S. Appl. No. 12/800,196, filed May 11, 2010, "CoFe/Ni Multilayer Film With Perpendicular Anisotropy for Microwave Assisted Magnetic Recording," assigned to the same assignee as the present invention.
"Current-driven excitation of magnetic multilayers," by J.C. Slonczewski, et al., Journal of Magnetism and Magnetic Materials 159 (1996) L1-L7.
"Microwave Assisted Magnetic Recording," by Jian-Gang Zhu et al., IEEE Transactions on Magnetics, vol. 44, No. 1, Jan. 2008, pp. 125-131.
International Search Report PCT/US 11/00326 Mail date—Apr. 25, 2011, Headway Technologies.

* cited by examiner

*Primary Examiner* — Will J Klimowicz
(74) *Attorney, Agent, or Firm* — Saile Ackerman LLC; Stephen B. Ackerman (57) ABSTRACT

A microwave assisted magnetic recording writer is disclosed with an octagonal write pole having a top portion including a trailing edge that is self aligned to a spin transfer oscillator (STO). Leading and trailing edges are connected by two sidewalls each having three sections. A first section on each side is coplanar with the STO sidewalls and is connected to a sloped second section at a first corner. Each second section is connected to a third section at a second corner where the distance between second corners is greater than the distance between first corners. A method of forming the writer begins with a trapezoidal shaped write pole in an insulation layer. Two ion beam etch (IBE) steps are used to shape top and middle portions of the write pole and narrow the pole width to <50 nm without breakage. Finally, a trailing shield is formed on the STO.

24 Claims, 6 Drawing Sheets

PROCESS OF OCTAGONAL POLE FOR MICROWAVE ASSISTED MAGNETIC RECORDING (MAMR) WRITER

RELATED PATENT APPLICATIONS

This application is related to the following: Ser. No. 12/800,196, filing date May 11, 2010; and U.S. Patent Application Publication 2009/0257151, assigned to the same assignee and herein incorporated by reference in their entirety.

FIELD OF THE INVENTION

The invention relates to an octagonal shaped write pole at the ABS and a spin transfer oscillator (STO) formed thereon for microwave assisted magnetic recording and a method for making the same that avoids damaging a write pole with a critical dimension of less than about 50 nm for $\geq 750$ Gbit/inch$^2$ recording density applications.

BACKGROUND OF THE INVENTION

Magnetoresistive Random Access Memory (MRAM), based on the integration of silicon CMOS with MTJ technology, is a major emerging technology that is highly competitive with existing semiconductor memories such as SRAM, DRAM, and Flash. Similarly, spin-transfer (spin torque or STT) magnetization switching described by C. Slonczewski in "Current driven excitation of magnetic multilayers", J. Magn. Magn. Mater. V 159, L1-L7 (1996), has recently stimulated considerable interest due to its potential application for spintronic devices such as STT-MRAM on a gigabit scale. As the size of MRAM cells decreases, the use of external magnetic fields generated by current carrying lines to switch the magnetic moment direction becomes problematic. One of the keys to manufacturability of ultra-high density MRAMs is to provide a robust magnetic switching margin by eliminating the half-select disturb issue. For this reason, a new type of device called a spin transfer (spin torque) device was developed. Compared with conventional MRAM, spin-transfer torque or STT-MRAM has an advantage in avoiding the half select problem and writing disturbance between adjacent cells. The spin-transfer effect arises from the spin dependent electron transport properties of ferromagnetic-spacer-ferromagnetic multilayers. When a spin-polarized current transverses a magnetic multilayer in a CPP configuration, the spin angular moment of electrons incident on a ferromagnetic layer interacts with magnetic moments of the ferromagnetic layer near the interface between the ferromagnetic and non-magnetic spacer. Through this interaction, the electrons transfer a portion of their angular momentum to the ferromagnetic layer. As a result, spin-polarized current can switch the magnetization direction of the ferromagnetic layer if the current density is sufficiently high, and if the dimensions of the multilayer are small. The difference between a STT-MRAM and a conventional MRAM is only in the write operation mechanism. The read mechanism is the same.

Figure 1:
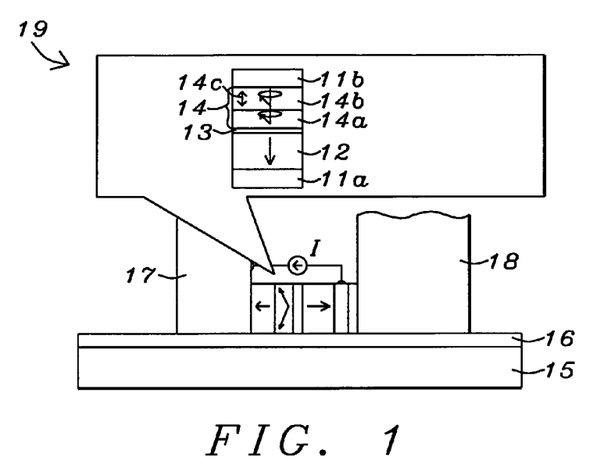
FIG. 1 is a schematic illustration of a MAMR recording head with an ac field assisted perpendicular head design according to a prior art reference.

Recently, J-G. Zhu et al. described another spintronic device called a spin transfer oscillator in "Microwave Assisted Magnetic Recording", IEEE Trans. on Magnetics, Vol. 44, No. 1, pp. 125-131 (2008) where a spin transfer momentum effect is relied upon to enable recording at a head field significantly below the medium coercivity in a perpendicular recording geometry. A field generator is placed inside the write gap (between the magnetic pole and write shield) to produce a high frequency field in the media. FIG. 1 is taken from the aforementioned reference and shows an ac field assisted perpendicular head design. The upper caption 19 represents a perpendicular spin torque driven oscillator for generating a localized ac field in a microwave frequency regime and includes a bottom electrode 11a, top electrode 11b, perpendicular magnetized reference layer 12 (spin injection layer or SIL), metallic spacer 13, and oscillating stack 14. Oscillator stack 14 is made of a field generation layer (FGL) 14a and a layer with perpendicular anisotropy 14b having an easy axis 14c. The ac field generator in the upper caption 19 is rotated 90 degrees with respect to the lower part of the drawing where the device is positioned between a write pole 17 and a trailing shield 18. The writer moves across the surface of a magnetic media 16 that has a soft underlayer 15. The reference layer 12 provides for spin polarization of injected current (I). Layers 14a, 14b are ferromagnetically exchanged coupled. The media grain can be switched under lower write field due to the assisting AC field. Thus, MAMR is considered to be one of the future technologies which may further improve recording density of perpendicular recording beyond 1 Terabit per square inch.

PMA materials have been considered for MAMR applications. Spintronic devices with perpendicular magnetic anisotropy have an advantage over MRAM devices based on in-plane anisotropy in that they can satisfy the thermal stability requirement but also have no limit of cell aspect ratio. As a result, spin valve structures based on PMA are capable of scaling for higher packing density which is a key challenge for future MRAM applications and other spintronic devices.

A microwave frequency field generator is also called a spin oscillator and is typically made of a multilayer film resembling a current perpendicular to plane (CPP) giant magnetoresistive (GMR) or tunneling magnetoresistive (TMR) spin valve. A detailed structure has been described in U.S. Patent Application Publication 2008/0019040. In general, a spin transfer oscillator (STO) includes a non-magnetic spacer sandwiched between a spin injection layer (SIL) and a field generation layer (FGL). The SIL has perpendicular magnetic anisotropy (PMA) and is magnetized in a direction parallel to the down track direction of the write head. When electrons transit the SIL and become polarized, the polarized electrons then pass through the non-magnetic spacer and through the FGL to induce a gyromagnetic oscillation in the FGL.

Higher recording density requires a smaller pole width in the write pole at the air bearing surface (ABS). Since the overlying STO is typically self aligned, the same critical dimension is needed for the STO along the ABS. However, when recording density requires a pole width of about 50 nm or less, a self aligned STO/write pole is difficult to fabricate with the desired profile and shape control. Furthermore, an overhang profile (pole width>leading edge width) is usually generated with existing designs and processes that causes the write pole to break during ion milling.

U.S. Pat. No. 7,333,296 discloses a trapezoidal shaped pole layer formed in a non-magnetic pole encasing layer, and a polishing stopper layer to control the thickness of the pole layer. In U.S. Patent Application 2007/0283557, a bevel angle promotion layer is formed adjacent to the leading edge of a main pole to facilitate the ion milling process. However, neither of the aforementioned references address the issue with breakage during manufacture of a self aligned STO/write pole stack when pole width is less than about 50 nm. Therefore, an improved write pole/STO integrated design is needed to improve shape control and structure reliability for high recording MAMR devices.

SUMMARY OF THE INVENTION

One objective of the present invention is to design a write pole/STO stack along the ABS with a shape that resists breakage during MAMR device fabrication.

A second objective of the present invention is to provide a manufacturing process for making a write pole/STO stack in a MAMR device according to the first objective.

According to one embodiment of the present invention, these objectives are achieved with an octagonal shaped write pole (main pole) in which a leading edge is formed on a substrate, a trailing edge contacts a bottom side of a STO structure, and each side of the write pole that connects the trailing edge to the leading edge is comprised of three sections at the ABS. Thus, there are three portions of the octagonal shaped write pole including a top portion formed between the trailing edge and a first plane that is parallel to the trailing edge, a middle portion formed between the first plane and a second plane parallel to the trailing edge, and a bottom portion formed between the leading edge and the second plane. On each side, an end of the first section is connected to an end of the second section at a first corner formed on the first plane, and the other end of the second section is connected to an end of the third section at a second corner formed on the second plane. The top portion of the octagonal pole includes the trailing edge having a first width that is essentially equivalent (self-aligned) to the width of the overlying STO structure, and two sides that extend a first distance from the corners of the trailing edge to a first corner in a direction preferably perpendicular to the substrate. The middle or second section on each side forms an angle $\beta$ of 60 to 90 degrees with respect to a third plane that overlays a side of the top portion. The third plane and middle section diverge from the first corner. In other words, the second section except for the first corner is formed on an opposite side of the third plane with respect to the center point of the octagonal write pole. The third (bottom) section on each side forms a typical bevel angle $\delta$ of 5 to 15 degrees with respect to a fourth plane that is parallel to the third plane and intersects the second corner. The thickness of the top portion, middle portion, and bottom portion along a down track direction are from 300 to 1000 Angstroms, 0 to 200 Angstroms, and 1000 to 2000 Angstroms, respectively.

In one aspect, the STO structure contacting the trailing edge of the octagonal write pole has a bottom SIL configuration in which a SIL, non-magnetic spacer, and FGL are sequentially formed on the trailing edge. The STO may be further comprised of a seed layer between the SIL and trailing edge and a capping layer that contacts a top surface of the FGL and adjoins a bottom surface of an overlying trailing shield. Alternatively, the STO may have a top SIL configuration wherein a FGL, non-magnetic spacer, and SIL are sequentially formed on the trailing edge of the octagonal pole. Moreover, the STO may be further comprised of a seed layer between the FGL and trailing edge and a capping layer contacting a top surface of the SIL and adjoining a bottom surface of an overlying trailing shield.

The present invention encompasses a method of fabricating the octagonal write pole as described in the aforementioned embodiments. In a preferred embodiment, a trapezoidal write pole is formed within a mold forming layer by a conventional method. The trapezoidal write pole has a leading edge formed on a substrate and a trailing edge formed coplanar with a top surface of an adjacent dielectric layer. The leading edge and trailing edge are connected by two straight sides and the trailing edge has a greater width along the ABS than the leading edge in an embodiment where there is no leading edge taper. Alternatively, in a write pole with a leading edge taper, the leading edge may have a width at the ABS equal to or greater than that of the trailing edge. A bottom section of each straight side will eventually become the third section of each side in the preferred embodiment. Thereafter, a STO stack of layers is deposited on the trialing edge and on the top surface of the adjacent dielectric layer. A second stack comprised of a lower bottom anti-reflective coating (BARC) and an upper photoresist layer is formed on the STO stack and patterned to generate a photoresist line which is aligned above the trailing edge of the write pole. The photoresist line has a width less than the width of the trailing edge. Once the photoresist line is defined, the BARC not protected by the photoresist is removed by an oxygen reactive ion etch (RIE) step. Next, a first ion beam etch (IBE) is performed at an angle of about 13 degrees with respect to the vertical sides of the photoresist line and removes the unprotected STO layer and about a 500 Angstrom thickness of the write pole below the unprotected STO layer. In so doing, a straight sidewall is formed that extends from each side of the photoresist layer, along the STO stack of layers, and into the write pole to define an STO structure and a self aligned top portion of the write pole. The thickness of the adjacent dielectric layer is lowered to a level that is coplanar with the first plane that passes through a first corner on each side of the write pole.

The second section of each side wall on the octagonal write pole is defined by a second IBE step that immediately follows the first IBE step. The second IBE step involves a side trim using a 65 degree angle with respect to the vertical photoresist sidewalls and a sweeping motion to remove redeposited materials and to trim the STO structure to a desired width of around 50 nm or less. The level of the adjacent dielectric layer is lowered to be coplanar with the second plane that passes through a second corner of each write pole side.

In the following step, a silicon oxide layer and Ru etch stop layer are sequentially deposited on the top surface of the dielectric layer and conformally along the STO structure and photoresist line. A third IBE step is performed at an 80 degree angle to selectively remove the silicon oxide layer and Ru layer and redeposited material surrounding the photoresist line. Then, hot NMP is used to strip the photoresist layer and oxygen ashing is used to remove the underlying BARC. A CMP kiss lap process is employed to remove possible fencing material or photoresist residue. As a result, a top surface of the STO structure is formed coplanar with the adjoining silicon oxide layer, and with a top surface of the remaining Ru layer. Finally, a seed layer and trailing shield are sequentially formed on the Ru layer, and on adjacent top surfaces of the silicon oxide layer and STO structure.

DETAILED DESCRIPTION OF THE INVENTION

The present invention includes an octagonal shaped write pole with a trailing edge and a STO structure formed on the trailing edge for microwave assisted magnetic recording. Various embodiments are depicted including top SIL and bottom SIL configurations. The present invention also encompasses a write pole with one or both of a leading edge taper and a trailing edge taper. The trailing shield is not limited to a shape depicted in the exemplary embodiments. In particular, a pp 3 portion that extends over the coils and towards a back end of the device may have a dome shape rather than a flat top surface. The terms "top" and "trailing" refer to a surface that faces away from the substrate. Write pole and main pole may be used interchangeably.

In related U.S. Patent Application 2009/0257151, we described the use of a thin composite seed layer including at least Ta and a metal layer having a fcc(111) or hcp(001) structure to enhance PMA in an overlying $(Co/Ni)_n$ multi-layer structure. Further, in related patent application HT09-037, we disclosed laminated magnetic layers with high PMA that may be exchange coupled with high Bs layers to improve the robustness of a spin injection layer (SIL) and enable easier oscillations in a field generation layer (FGL). Various configurations of a spin transfer oscillator (STO) were described that include a thin seed layer to assist in establishing high PMA in laminated $(CoFe/Ni)_x$ layers and the like where x is from about 5 to 50.

Additionally, in related patent application HT08-048, a PMR writer with a pagoda shaped pole and all around shield was described and provides a process for forming a leading shield that is conformal with a leading edge of a write pole.

Figure 2A:
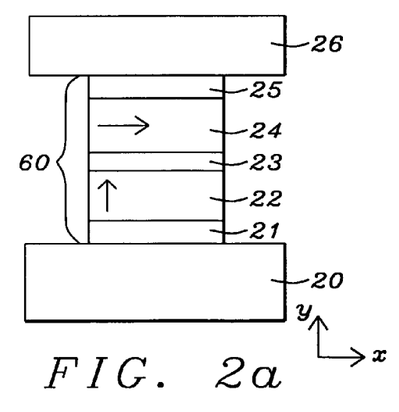
FIG. 2a shows an example of a MAMR structure with a bottom SIL configuration where a SIL, non-magnetic spacer, and FGL are sequentially formed on a substrate.

Referring to FIG. 2a, a STO 60 with a "bottom" SIL configuration is depicted wherein a seed layer 21, SIL 22, non-magnetic spacer 23, FGL 24, and capping layer 25 are sequentially formed on a main pole layer 20. There is a trailing shield 26 contacting a top surface of the capping layer 25. The composite seed layer 21 may be represented by Ta/M1 where M1 is an upper metal layer having a fcc(111) or hcp(001) crystal orientation such as Ru, Cu, Ti, or Au, or is a NiCr alloy. Furthermore, seed layer 21 may have a trilayer configuration represented by Ta/M1/M2 where M2 is one of Ti, Pd, W, Rh, Au, or Ag, and M1 is unequal to M2. In one aspect, FGL 24 may be FeCo. The non-magnetic spacer 23 between the SIL and FGL may be a metal such as Cu in a CPP-GMR configuration or a dielectric layer such as MgO, AlOx, TiOx, TiAlOx, MgZnOx, ZnOx in a CPP-TMR configuration. Capping layer 25 preferably is made of Ru, but may be a single layer or composite layer comprised of other capping layer materials used in the art.

Figure 2B:
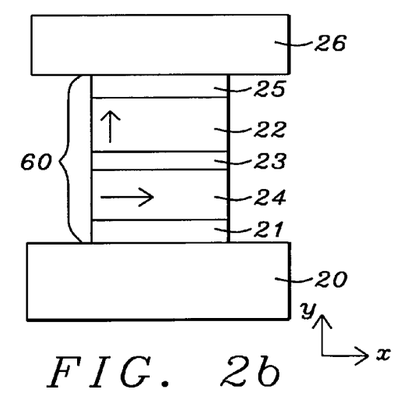
FIG. 2b shows an example of a MAMR structure with a top SIL configuration where a FGL, non-magnetic spacer, and SIL are sequentially formed on a substrate.

In FIG. 2b, a STO 60 with a "top" SIL configuration is shown in which a seed layer 21, FGL 24, non-magnetic spacer 23, SIL 22, and capping layer 25 are sequentially formed on a main pole layer 20. Trailing shield 26 contacts a side of the capping layer 25 opposite the non-magnetic spacer.

Figure 3:
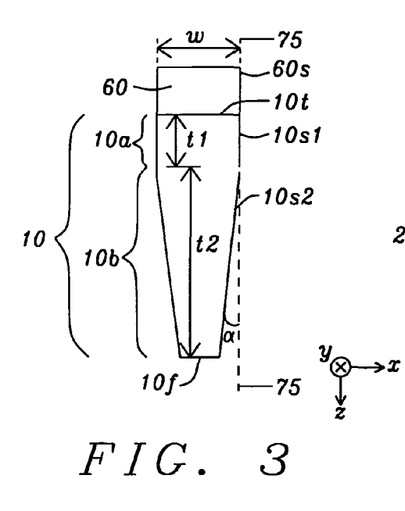
FIG. 3 depicts an ABS view of a self aligned write pole (main pole) and STO that has been previously fabricated by the inventors.

Referring to FIG. 3, the inventors have practiced a fabrication process where a STO 60 is self aligned to a write pole 10 in a MAMR device. Note that STO 60 has a side 60s aligned with side 10s1 of top write pole portion 10a along a plane 75-75 that is perpendicular to the ABS. Thus, STO 60 and trailing edge 10t of write pole 10 have a width w at the ABS. Leading edge 10f has a width less than w since sides 10s2 are formed at a bevel angle α with respect to plane 75-75. Typically, the thickness t1 of the top portion 10a is less than the thickness t2 of the bottom portion 10b of the write pole. In this case, the z-axis is the down track direction during a write process.

It should be understood that to use a STO in MAMR, a critical feature is to place the STO as close as possible to the trailing edge of the write pole. Moreover, the STO AC field must be aligned with the writing field in a cross track direction which is along the x-axis in this example. With a self-aligned structure, the STO 60 and write pole 10 may be patterned using one photolithography process to define the width w in a photoresist layer (not shown) followed by a reactive ion etch (RIE) or ion beam etch method to transfer the pattern through the STO stack of layers and write pole layer as appreciated by those skilled in the art. However, as pole width w become smaller, fabrication of the self aligned STO/write pole structure becomes quite difficult, especially for a 750 Gbit/in$^2$ to 1 Tbit/in$^2$ recording density where the track width (pole width w) is in the sub-50 nm range. In particular, a pole width w of <50 nm combined with a bevel angle α of 7 to 15 degrees results in a write pole 10 with an overhang profile which leads to breakage in the narrow lower portion 10b during ion milling. In addition, as pole width shrinks, the amount of ion milling (IBE) increases and leads to shape control issues.

Figure 4:
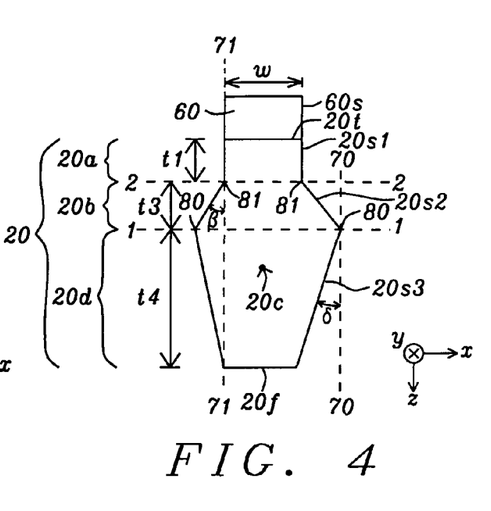
FIG. 4 depicts an octagonal write pole at the ABS and a STO that is self aligned with a trailing edge in a top portion of the write pole according to an embodiment of the present invention.

Referring to FIG. 4, a new write pole shape is disclosed according to one embodiment of the present invention and overcomes the limitation of the prior art regarding write pole breakage during fabrication of devices with a pole width less than about 50 nm which is required for high recording densities. The modified write pole 20 retains the features of self alignment of a top portion 20a with an overlying STO 60 but the bottom 10b in write pole 10 is replaced in the exemplary embodiment by two portions 20b, 20d bounded by sidewalls 20s2, 20s3, respectively, that converge on each side at a corner 80. An important feature is that middle portion 20b has a variable width in a cross track direction (along the x-axis) that is greater than pole width w to prevent breakage during fabrication when w is about 50 nm or less. Therefore, the distance between corners 80 along a plane 1-1 that marks the interface between middle portion 20b and bottom portion 20d and is parallel to the trailing edge 20t is greater than the width w of STO 60 and the trailing edge. In other words, corner 80 is formed on an opposite side of a plane 71-71 aligned with sidewalls 60s, 20s1 with respect to a center point 20c of the write pole. Center point 20c is defined as a point midway between leading edge 20f and trailing edge 20t and along a plane (not shown) that is parallel to plane 71-71 and bisects the write pole 20. Preferably, sidewalls 60s, 20s1 are aligned essentially perpendicular to trailing edge 20t and leading edge 20f. However, sidewalls 60s, 20s1 may have an angle between 80 and 90 degrees with respect to plane 2-2 and still provide substantially the same benefits as described for the preferred embodiment.

The modified write pole 20 has an octagonal shape with a trailing edge 20t having a pole width w and contacting a bottom surface of STO 60. There is a leading edge 20f that is parallel to the trailing edge 20t and formed on a substrate (not shown). Each side of the write pole 20 is comprised of three sidewall sections 20s1, 20s2, 20s3. A first section 20s1 is essentially a straight line that extends from one end of trailing edge 20t and connects with an end of second section 20s2 at a first corner 81 on each side. One first corner 81 is formed on plane 71-71, and along a plane 2-2 that is parallel to trailing edge 20t. The other first corner 81 is formed on the opposite side of write pole 20 on plane 2-2. Plane 2-2 is formed a distance t1 of 300 to 1000 Angstroms from the trailing edge in a down track direction and marks the interface between top portion 20a and middle portion 20b. Second section 20s2 is formed at an angle β of 60 to 90 degrees with respect to plane 71-71.

Second section 20s2 is a line connecting a first corner 81 with a second corner 80 which is formed on a plane 1-1 that is parallel to the trailing edge 20t and is formed a distance t3 of about 0 to 200 Angstroms in a down track (z-axis) direction from plane 2-2. Third section 20s3 is formed at an angle δ of 5 to 15 degrees with respect to a plane 70-70 that passes through corner 80 and is perpendicular to leading edge 20f and trailing edge 20t. Thus, an end of section 20s2 is connected to an end of first section 20s1 and the other end of section 20s2 is connected to an end of section 20s3.

Third section 20s3 is essentially a straight line connecting leading edge 20f to a second corner 80. The thickness t4 of the bottom portion 20d of write head 20 (distance between plane 2-2 and leading edge 20f along a z-axis direction) is between 1000 and 2000 Angstroms. In one aspect, the width of leading edge 20f at the ABS is greater than pole width w. This condition may be acceptable when there is a leading edge taper on write pole 20 as described later. On the other hand, the present invention also anticipates that the width of leading edge 20f may be equal to or smaller than w to compensate for the skew effect during a write process and thereby minimize side track erasure, especially in an embodiment with no leading edge taper.

According to one embodiment, the octagonal shape of write pole 20 extends in a direction perpendicular to the ABS (behind the plane of the paper) and towards the back end (not shown) of the write head by a neck height distance and is equivalent to the distance the STO 60 extends perpendicular to the ABS. The remainder of the write pole between the neck height distance and so called back end may have a traditional trapezoid shape. A process flow for forming an octagonal write pole shape as defined herein will be described with regard to FIGS. 5-13.

Figure 5:
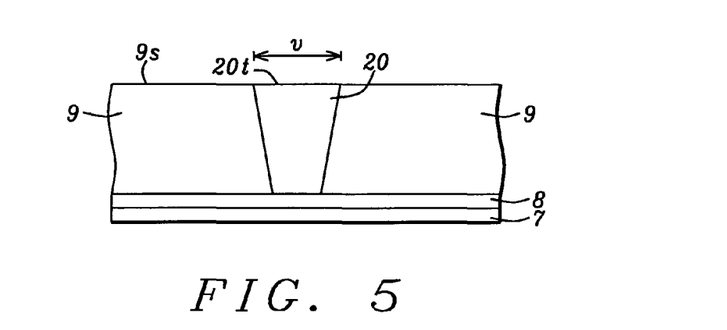
FIGS. 5-13 show various steps in the formation of an octagonal pole with a top portion including a trailing edge that is self aligned with a STO where a trailing side of the STO contacts a trailing shield according to an embodiment of the present invention.

Referring to FIG. 5, an intermediate step in the formation of an octagonal write pole 20 as previously described is depicted. There is a substrate 7 such as AlTiC on which an etch stop layer 8 otherwise known as a RIE resistant layer is deposited. The RIE resistant layer 8 may formed on substrate 7 by a sputter deposition or PVD process, for example, and preferably includes a material such as Ru or NiCr that has a high etch selectivity relative to an insulating layer made of alumina or the like during a subsequent RIE etch that uses $BCl_3$, chlorine, and fluorocarbon gases. An insulation layer 9 is formed on the RIE resistant layer 8 and may be comprised of $Al_2O_3$ or silicon oxide that is deposited by a PVD process, a sputtering technique, or the like in the same deposition tool as the RIE resistant layer. The insulation layer 9 may also be made of other dielectric materials known in the art.

A write pole 20 is formed within insulation layer 9 by a conventional method that involves forming an opening in the insulation layer and plating a magnetic material to fill the opening. After a chemical mechanical polish (CMP) step, the magnetic layer (write pole 20) becomes coplanar with insulation layer 9. Alternatively, a hard mask (not shown) may be formed on the insulation layer prior to forming an opening. The hard mask made of Ta, for example, is advantageously employed in a subsequent RIE step where an opening in a photoresist pattern is transferred into the insulation layer. Together, a hard mask and insulation layer 9 may be considered a composite mold forming layer and have a combined thickness essentially equivalent to the desired thickness of the write pole to be deposited in a later step. The top surface of the write pole at the ABS is the trailing edge 20t with an initial width v of around 80 to 150 nm which is greater than the final width w of about 50 nm or less in the octagonal write pole formed at the end of the fabrication process.

Figure 6:
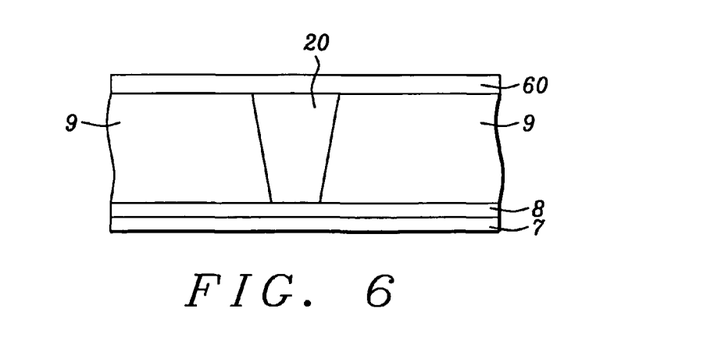

Referring to FIG. 6, a STO stack of layers 60 is deposited on the top surface 9s of insulation layer 9 and on trailing edge 20t. A STO stack with the thicknesses of the individual layers in the stack is described in related patent application HT09-037 and may be deposited in a sputter deposition mainframe such as an Anelva sputter deposition tool. Generally, a STO stack of layers has a thickness of about 300 to 600 Angstroms. The present invention also encompasses an annealing step after all layers in STO stack 60 have been deposited. The annealing process comprises a temperature between 150° C. and 300° C., and preferably between 180° C. and 250° C. for a period of 0.5 to 5 hours. No applied magnetic field is necessary during the annealing step because PMA is established due to the fcc(111) or hcp(001) texture in the composite seed layer 21 and due to the CoFe—Ni spin orbital interactions or the like when one or both of SIL 22 and FGL 24 in STO 60 are laminated layers as described in related patent application HT09-037. However, the present invention also anticipates that a magnetic field may be applied during annealing to further increase PMA in one or both of the SIL 22 and FGL 24.

Figure 7:
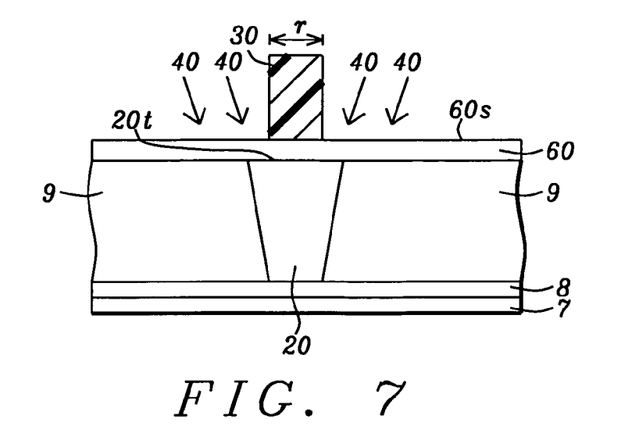

Referring to FIG. 7, a bottom anti-reflective coating or BARC (not shown) and a photoresist layer 30 are sequentially coated on the STO stack 60. The photoresist layer is patterned by a conventional method to provide a photoresist feature 30 aligned above write pole 20 in a down track direction and having a width r in the x-axis (cross track) direction where v is greater than r. In one example, the BARC is approximately 35 nm thick and the photoresist layer before patterning has a thickness of around 270 nm. It should be understood that to achieve a smaller width r, a thinner photoresist layer may be necessary so that narrower photoresist features 30 can be printed without collapsing by avoiding a high aspect ratio (height/width). After the photoresist feature 30 is defined, the BARC that was uncovered during the photoresist development step is removed by an oxygen RIE process also known as $O_2$ ashing. For example, a mixture of $O_2$ and Ar plasma applied for a period of 160 seconds is typically sufficient to remove the exposed BARC material and uncover STO top surface 60s. Thereafter, a first IBE etch step is performed in which the incident angle of ions 40 is approximately 0 to 20 degrees, and preferably 13 degrees, with respect to the essentially vertical sidewalls of photoresist feature 30.

Figure 8:
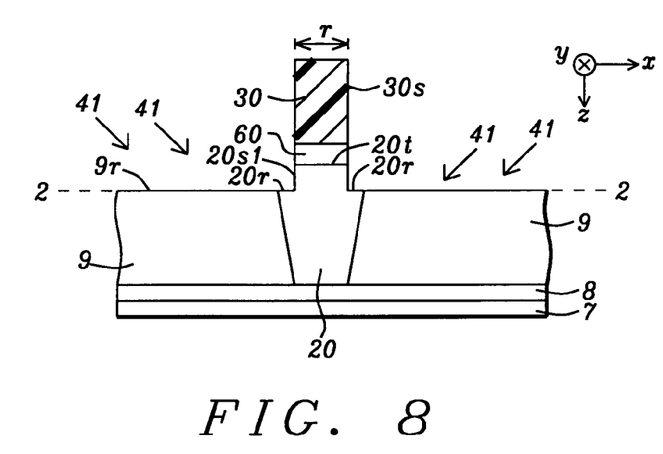

Referring to FIG. 8, as a result of the first IBE etch, the STO stack 60 not protected by photoresist feature 30 is removed. Furthermore, the first IBE etch continues until about 300 Angstroms of the upper portion of write pole 20 and adjacent insulation layer 9 are removed. STO 60 is thereby self-aligned with the overlying photoresist feature 30 and underlying top portion having sidewalls 20s1 of modified write pole 20 such that the STO and top portion have a width r in the cross track direction. A top surface 9r of insulation layer 9 is now formed along a plane 2-2 that is coplanar with a top surface 20r of the unetched bottom portion of write pole 20. Preferably, a second IBE etch is performed immediately thereafter and in the same etch chamber as the first IBE etch step. Ions 41 are directed towards the surfaces 9r, 20r at an angle of about 45 to 80 degrees, and preferably 65 degrees with respect to sidewalls 30s and with a sweeping motion to trim the sidewalls 30s, 20s1, and the sides of STO 60 as well as to remove redeposited materials from the prior etch step. From a top view (not shown), photoresist feature 30 as well as STO 60 and the self aligned top portion of write pole 20 preferably have a square or rectangular shape in which the lengthwise direction perpendicular to the ABS has a length equal to or greater than the width r. In one embodiment, the lengthwise direction of STO 60 and the etched top portion of write pole 20 extend a neck height distance from the ABS towards a back end of the writer.

Figure 9:
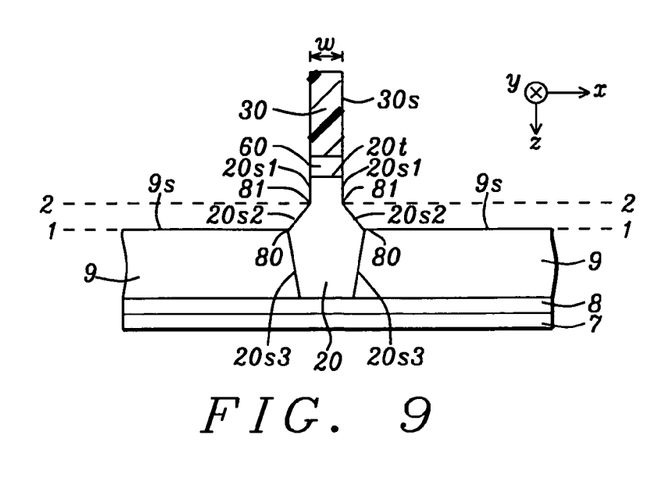

Referring to FIG. 9, a cross-sectional view of the octagonal write pole 20 is shown following the second IBE etch. Sidewalls 20s2 are now defined and the adjacent insulation layer 9 has been thinned to a level where top surface 9s coincides with plane 1-1 that passes through corners 80. Sidewalls 20s3 and the bottom write pole portion below plane 1-1 are the only parts of the original write pole 20 (FIG. 5) that have not been modified by IBE processing. The second IBE etch trims the width of the photoresist layer 30 and underlying STO 60 and top write pole portion above corners 81 to a width w of about 50 nm or less.

Figure 10:
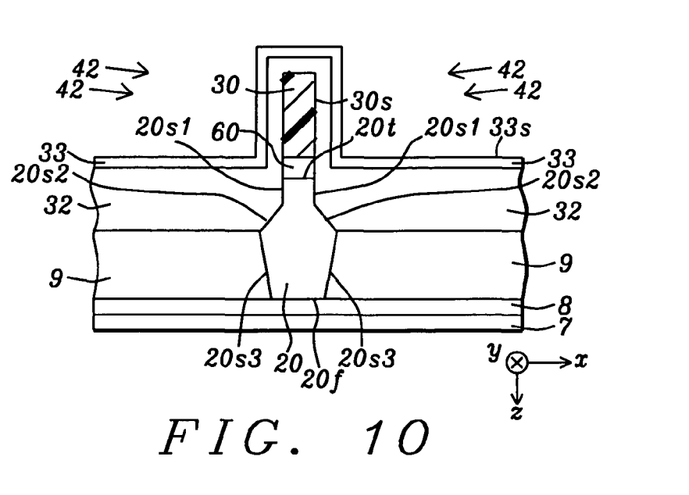

Referring to FIG. 10, a dielectric layer 32 that is preferably silicon oxide is deposited by an ion beam deposition process on top surface 9s, photoresist feature 30, along STO 60, and on sidewalls 20s1 and 20s2 of octagonal write pole 20. Optionally, dielectric layer 32 may be comprised of silicon nitride, silicon oxynitride, or AlOx although the latter is less preferred. According to one embodiment, the IBD procedure is accomplished in two steps by first using a 25 to 55 degree, and preferably 45 degree, deposition angle to deposit approximately a 200 Angstrom thick highly conformal portion of dielectric layer 32. Then the IBD angle is changed to 70 to 85 degrees, and preferably 75 degrees, with a shaper to improve film uniformity and deposit another 500 Angstroms of dielectric layer 32. As a result, the dielectric layer 32 has thinner regions adjacent to photoresist sidewalls 30s and thicker regions above insulation layer 9. Next, a highly conformal etch stop layer 33 that is preferably Ru with a thickness of about 170 Angstroms is formed on dielectric layer 32 by an IBD method involving a 25 to 55 degree, and preferably 45 degree deposition angle. The Ru layer 33 will be employed in a later step as a CMP stop layer. Optionally, etch stop layer 33 may be comprised of Rh, Pt, Ir, Ta, or the like. An important feature is that the portion of top surface 33s above insulation layer 9 and formed parallel to the plane of substrate 7 is essentially coplanar with the top surface of STO 60. Thereafter, a third IBE step is performed in which Ar ions 42 are directed at about a 70 to 85 degree, and preferably 80 degree angle with respect to the sidewalls 30s for approximately 500 seconds in order to remove the dielectric layer 32 and etch stop layer 33 surrounding photoresist feature 30.

Figure 11:
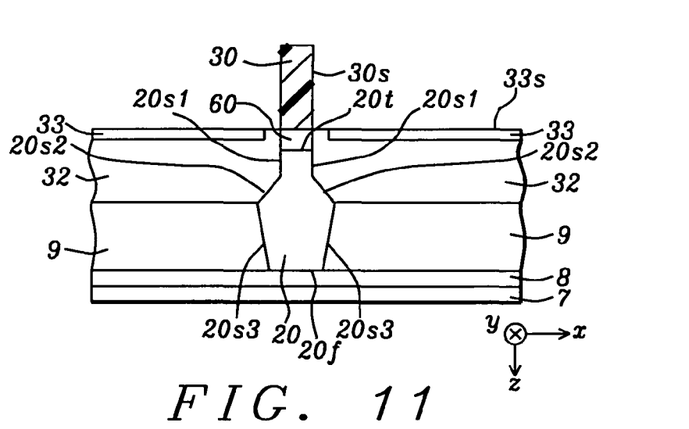

Referring to FIG. 11, the photoresist feature 30 is shown with exposed sidewalls 30s following the third IBE step. The Ru layer 33 with top surface 33s formed above insulation layer 9 and dielectric layer 32 remains essentially intact. There is a portion of dielectric layer 32 between Ru layer 33 and STO 60 that is coplanar with top surface 33s.

Figure 12:
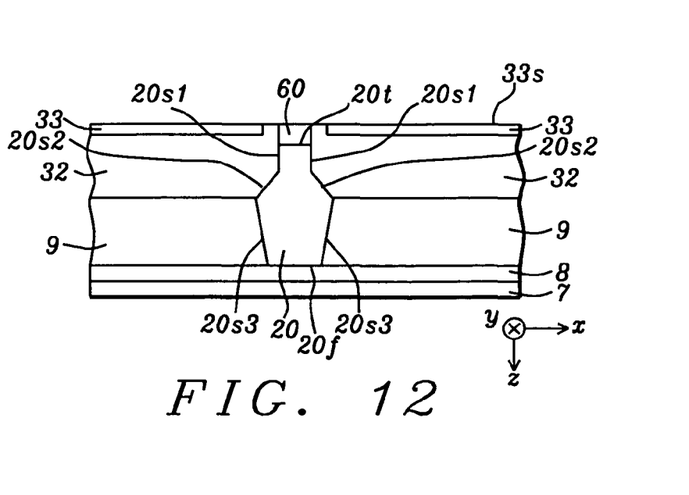

As depicted in FIG. 12, a final sequence of steps to fabricate a self aligned STO 60 with a top portion 20s1 of an octagonal write pole 20 results in a top surface of STO 60 that is coplanar with top surface 33s. First, hot NMP is applied for a sufficient amount of time to strip the photoresist feature 30 and any residue on the top surface thereof. In one embodiment, an oxygen ashing method similar to the one described previously may be employed to remove the BARC that was exposed after photoresist feature 30 is stripped. Next, a CMP kiss lap process is performed to remove any fencing material remaining from the IBE steps, BARC, and photoresist residues from the NMP treatment and oxygen ashing. The CMP kiss lap process is a well known method that involves only mechanical action with no chemical etching as the method comprises slurry and water with no base or acid component.

Figure 13:
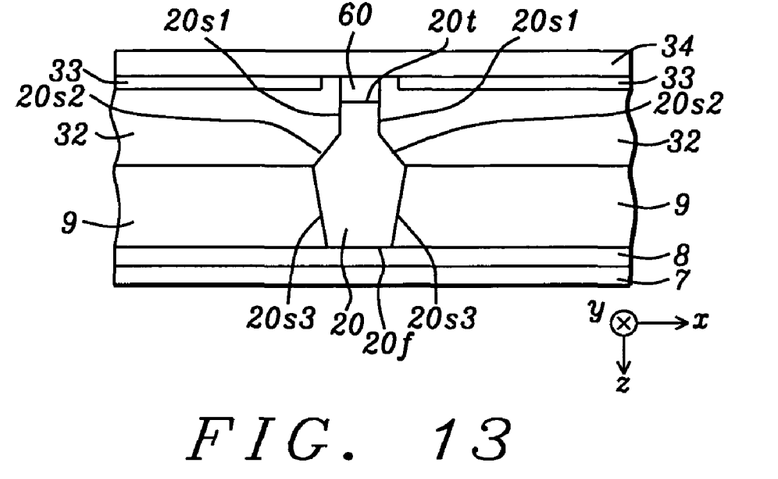

Referring to FIG. 13, a seed layer (not shown) and a trailing shield 34 are sequentially formed on Ru layer 33, STO 60, and adjacent exposed portions of dielectric layer 32.

Figure 14:
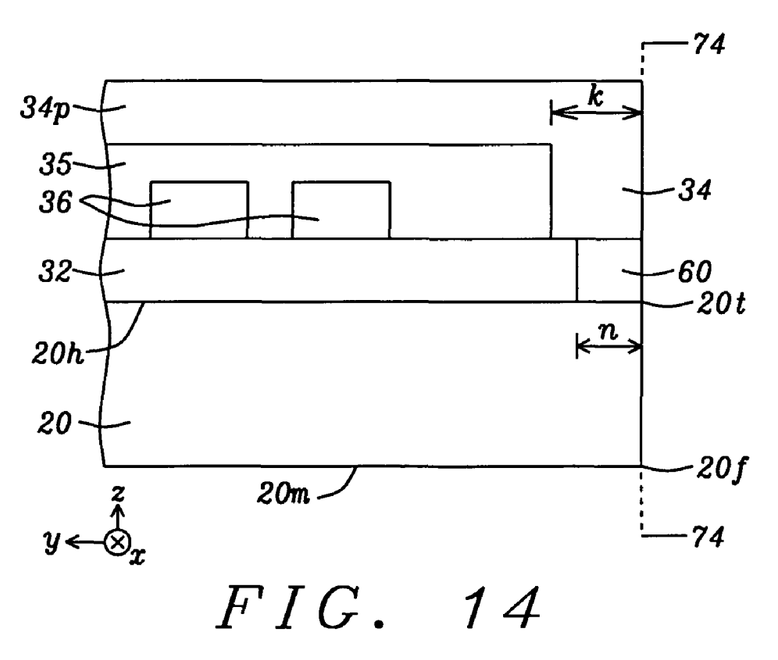
FIG. 14 is a cross-sectional view of an octagonal pole with a flat leading side, a STO contacting the trailing edge of the main pole, and a trailing shield on the trailing side of the STO according to one embodiment of the present invention.

In FIG. 14, a side view along the y-axis direction according to one embodiment of the self aligned STO/write pole structure in FIG. 13 is illustrated. In this case, leading edge 20f and trailing edge 20t are formed along ABS 74-74 and write pole 20 has no tapered edge. In other words, bottom surface 20m and top surface 20h each form a plane that is perpendicular to the ABS. STO 60 is shown with top and bottom surfaces that extend a neck height distance n towards the back end of the write pole 20. A front section 34 of the trailing shield structure extends a distance k from the ABS 74-74 where k>n, and a back pp 3 portion 34p is formed over a coil layer 36. In one aspect, coil layer 36 is formed on dielectric layer 32 and is surrounded on the sides by an insulation layer 35.

Figure 15:
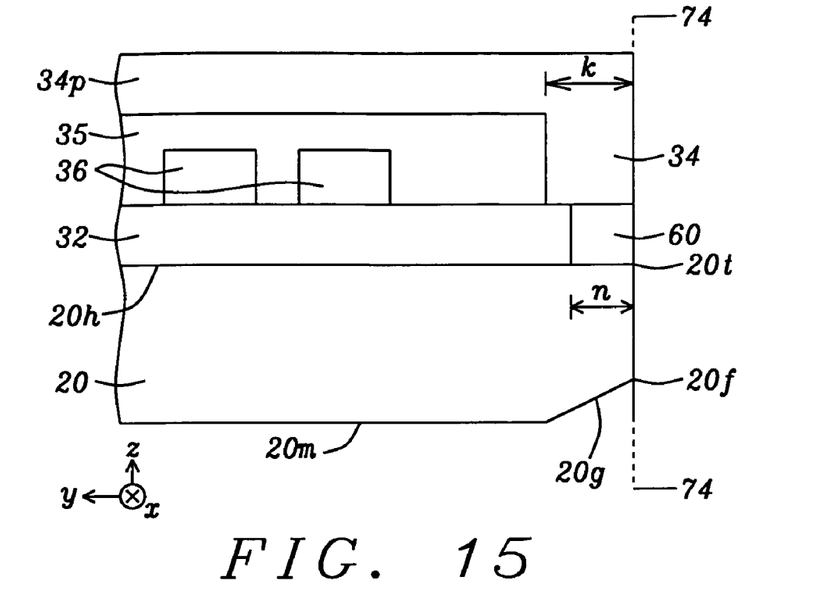
FIG. 15 is a cross-sectional view of an octagonal pole with a leading edge taper (LET), a STO contacting the trailing edge of the main pole, and a trailing shield on the trailing side of the STO according to another embodiment of the present invention.

Referring to FIG. 15, a cross-sectional view along the y-axis direction of a self aligned STO/octagonal write pole configuration according to a second embodiment of the present invention is shown. Here the leading edge 20f is at the ABS end of a tapered side 20g that connects the bottom surface 20m to the ABS 74-74. Thus, the write head is said to have a tapered leading edge. The distance between leading edge 20f and trailing edge 20t along the ABS is less than in the first embodiment (FIG. 14) where there is no taper on either of the leading or trailing edges. As mentioned earlier, a leading edge taper offsets the skew effect in an embodiment where the leading edge 20f has a width at the ABS which is greater than that of the trailing edge 20t.

Figure 16:
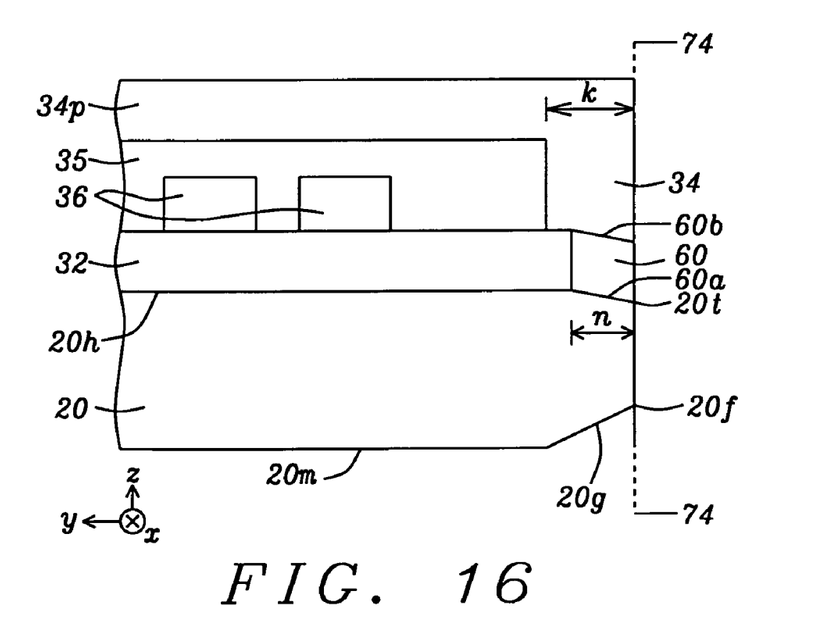
FIG. 16 is a cross-sectional view of an octagonal pole with LET, trailing edge taper, a STO contacting the tapered trailing side of the main pole, and a trailing shield on a tapered trailing side of the STO according to an embodiment of the present invention.

Referring to FIG. 16, a cross-sectional view along the y-axis direction of a self aligned STO/octagonal write pole configuration according to a third embodiment of the present invention is shown. Here the leading edge 20f is at the ABS end of a tapered side 20g that connects the bottom surface 20m to the ABS 74-74 and the trailing edge 20t is at the ABS end of a tapered side that overlays on STO tapered side 60a and connects top surface 20h to the ABS. Thus, the write head is said to have both of a tapered leading edge and tapered trailing edge. The distance between leading edge 20f and trailing edge 20t along the ABS is less than in the second embodiment (FIG. 15) where there is only one tapered side on write pole 20. STO 60 also has a tapered trailing side 60b.

The present invention also encompasses an embodiment (not shown) with no tapered leading edge but where there is a tapered trailing edge between top surface 20h and the ABS 74-74. As appreciated by those skilled in the art, a tapered side including a tapered edge on a write pole may be formed by a conventional ion milling process and is not described herein. It should be understood that a tapered side including a tapered edge is formed prior to depositing a STO stack of layers.

With regard to a process of forming the various spin valve structures of the aforementioned embodiments, all of the layers in the CPP spin valve stack may be laid down in a sputter deposition system. For instance, the CPP stack of layers may be formed in an Anelva C-7100 thin film sputtering system or the like which typically includes three physical vapor deposition (PVD) chambers each having 5 targets, an oxidation chamber, and a sputter etching chamber. At least one of the PVD chambers is capable of co-sputtering. Typically, the sputter deposition process involves an argon sputter gas with ultra-high vacuum and the targets are made of metal or alloys to be deposited on a substrate. All of the CPP layers may be formed after a single pump down of the sputter system to enhance throughput.

The embodiments of the present invention provide an advantage over the prior art by avoiding a manufacturing concern regarding breakage of a main pole during fabrication of a STO structure self-aligned with a write pole having a narrow pole width. Furthermore, a process for forming an octagonal shape to improve structural integrity of the write pole is provided while maintaining self alignment between a top portion of the write pole and an adjoining STO. The manufacturing process is compatible with the formation of a tapered leading edge or tapered trailing edge on the write pole to further improve writability and can be scaled to produce write pole widths less than 50 nm to achieve higher recording density. The STO structure may include improvements described in related patent applications such as laminated SIL and FGL components to enable easier FGL oscillations and improve SIL robustness for MAMR applications.

While this invention has been particularly shown and described with reference to, the preferred embodiment thereof, it will be understood by those skilled in the art that various changes in form and details may be made without departing from the spirit and scope of this invention.

We claim:

1. A microwave assisted magnetic recording (MAMR) writer structure having a spin transfer oscillator (STO) self aligned to an adjoining octagonal shaped portion of a write pole along an air bearing surface (ABS), comprising:
   (a) an octagonal write pole formed on a substrate, comprising:
      (1) a lower portion including a leading edge of the octagonal write pole and two lower sections of write pole sidewalls formed at a first angle with respect to a plane that is perpendicular to the substrate and to the ABS such that the width of the leading edge is less than the distance between two ends of the two lower sections that are a first distance from the substrate in a down track direction;
      (2) a middle portion including two middle sections of write pole sidewalls each having a first end connected to an end of an upper sidewall section at a first corner, and a second end connected to an end of a lower sidewall section at a second corner, said middle sections of sidewalls each form a second angle with respect to a plane that is perpendicular to the substrate and to the ABS and a distance between second corners along a second plane parallel to the substrate is greater than a distance between first corners along a first plane parallel to the substrate; and
      (3) a top portion including a trailing edge of the octagonal write pole and two upper sidewall sections that extend in a down track direction from two ends of the trailing edge such that an end of each upper sidewall section opposite the trailing edge connects with an end of a middle sidewall section at a first corner; and
   (b) a STO with a lower surface that contacts the trailing edge of the octagonal write pole, a top surface, and two sidewalls that connect the top surface with the lower surface and are formed coplanar with the upper sidewall sections of the top portion of the octagonal write pole, said STO is comprised of a spin injection layer (SIL), non-magnetic spacer, and field generation layer (FGL) that are sequentially formed on the trailing edge.

2. The MAMR writer structure of claim 1 wherein the first distance is from about 1000 to 2000 Angstroms.

3. The MAMR writer structure of claim 1 wherein the first angle is between about 5 and 15 degrees, and the second angle is between about 60 and 90 degrees.

4. The MAMR writer structure of claim 1 wherein a distance between a first plane parallel to the substrate and connecting the two first corners and a second plane parallel to the substrate and connecting the two second corners is from 0 to about 200 Angstroms and represents a thickness of the middle portion in a down track direction.

5. The MAMR writer structure of claim 1 wherein the STO and adjoining portion of the octagonal write pole extend a neck height distance from the ABS in a direction perpendicular to the ABS.

6. The MAMR writer structure of claim 4 wherein a distance between a first corner on a first plane and an end of the trailing edge is from about 300 to 1000 Angstroms and represents a thickness of the top portion in a down track direction.

7. The MAMR writer structure of claim 1 wherein the trailing edge has a width along the ABS in a cross track direction that is the pole width and is less than about 50 nm.

8. The MAMR writer structure of claim 1 wherein the STO is further comprised of a seed layer formed between the SIL and the trailing edge, and a capping layer as the uppermost layer in the STO and contacting a top surface of the FGL.

9. The MAMR writer structure of claim 8 further comprised of a trailing shield at the ABS and contacting a top surface of the STO.

10. The MAMR writer structure of claim 1 wherein the octagonal write pole is further comprised of a bottom surface that extends from the ABS at the leading edge in a direction perpendicular to ABS.

11. The MAMR writer structure of claim 1 wherein the octagonal write pole is further comprised of a leading edge taper.

12. The MAMR writer structure of claim 11 wherein the octagonal write pole is further comprised of a trailing edge taper.

13. A microwave assisted magnetic recording (MAMR) writer structure having a spin transfer oscillator (STO) self aligned to an adjoining octagonal shaped portion of a write pole along an air bearing surface (ABS), comprising:
   (a) an octagonal write pole formed on a substrate, comprising:
      (1) a lower portion including a leading edge of the octagonal write pole and two lower sections of write pole sidewalls formed at a first angle with respect to a plane that is perpendicular to the substrate and to the ABS such that the width of the leading edge is less than the distance between two ends of the two lower sections that are a first distance from the substrate in a down track direction;
      (2) a middle portion including two middle sections of write pole sidewalls each having a first end connected to an end of an upper sidewall section at a first corner, and a second end connected to an end of a lower sidewall section at a second corner, said middle sections of sidewalls each form a second angle with respect to a plane that is perpendicular to the substrate and to the ABS and a distance between second corners along a second plane parallel to the substrate is greater than a distance between first corners along a first plane parallel to the substrate; and (3) a top portion including a trailing edge of the octagonal write pole and two upper sidewall sections that extend in a down track direction from two ends of the trailing edge such that an end of each upper sidewall section opposite the trailing edge connects with an end of a middle sidewall section at a first corner; and (b) a STO with a lower surface that contacts the trailing edge of the octagonal write pole, a top surface, and two sidewalls that connect the top surface with the lower surface and are formed coplanar with the upper sidewall sections of the top portion of the octagonal write pole, said STO is comprised of a field generation layer (FGL), non-magnetic spacer, and spin injection layer (SIL) that are sequentially formed on the trailing edge.

14. The MAMR writer structure of claim 13 wherein the first distance is from about 1000 to 2000 Angstroms.

15. The MAMR writer structure of claim 13 wherein the first angle is between about 5 and 15 degrees and the second angle is between about 60 and 90 degrees.

16. The MAMR writer structure of claim 13 wherein a distance between a first plane parallel to the substrate and connecting the two first corners and a second plane parallel to the substrate and connecting the two second corners is from 0 to about 200 Angstroms and represents a thickness of the middle portion in a down track direction.

17. The MAMR writer structure of claim 13 wherein the STO and adjoining portion of the octagonal write pole extend a neck height distance from the ABS in a direction perpendicular to the ABS.

18. The MAMR writer structure of claim 16 wherein a distance between a first corner on a first plane and an end of the trailing edge is from about 300 to 1000 Angstroms and represents a thickness of the top portion in a down track direction.

19. The MAMR writer structure of claim 13 wherein the trailing edge has a width along the ABS in a cross track direction that is the pole width and is less than about 50 nm.

20. The MAMR writer structure of claim 13 wherein the STO structure is further comprised of a seed layer formed between the FGL and the trailing edge, and a capping layer as the uppermost layer in the STO and contacting a top surface of the SIL.

21. The MAMR writer structure of claim 20 further comprised of a trailing shield at the ABS and contacting a top surface of the STO.

22. The MAMR writer structure of claim 13 wherein the octagonal write pole is further comprised of bottom surface that extends from the ABS at the leading edge in a direction perpendicular to ABS.

23. The MAMR writer structure of claim 13 wherein the octagonal write pole is further comprised of a leading edge taper.

24. The MAMR writer structure of claim 23 wherein the octagonal write pole is further comprised of a trailing edge taper.

* * * * *